United States Patent [19]

Huetter

[11] Patent Number: 4,941,392
[45] Date of Patent: Jul. 17, 1990

[54] SCATTER AMMUNITION CONTAINER

[75] Inventor: Horst Huetter, Tegernsee, Fed. Rep. of Germany

[73] Assignee: Messerschmitt-Boelkow-Blohm GmbH, Muenchen, Fed. Rep. of Germany

[21] Appl. No.: 455,972

[22] Filed: Dec. 22, 1989

[30] Foreign Application Priority Data

Dec. 22, 1988 [DE] Fed. Rep. of Germany ....... 3843164

[51] Int. Cl.⁵ .......................... F41F 3/06; F41F 5/02
[52] U.S. Cl. ...................... 89/1.51; 89/1.57; 89/1.819
[58] Field of Search ...................... 89/1.51, 1.52, 1.56, 89/1.57, 1.14, 1.815, 1.816, 1.818; 102/372

[56] References Cited

U.S. PATENT DOCUMENTS

| | | | |
|---|---|---|---|
| 2,938,434 | 5/1960 | Myron | 89/1.815 |
| 3,608,426 | 9/1971 | Jackson | 89/1.51 |
| 4,089,250 | 5/1978 | Jakubowski et al. | 89/1.56 |
| 4,172,407 | 10/1979 | Wentink | 89/1.56 |
| 4,263,835 | 4/1981 | Dragonuk | 89/1.51 |
| 4,307,650 | 12/1981 | Kuesters et al. | 89/1.56 |
| 4,444,085 | 4/1984 | Dragonuk | 89/1.51 |

FOREIGN PATENT DOCUMENTS 3500163 4/1986 Fed. Rep. of Germany.

Primary Examiner—David H. Brown
Attorney, Agent, or Firm—W. G. Fasse; D. H. Kane, Jr.

[57] ABSTRACT

A scatter ammunition container system has a plurality of container tubes which serve also as ejector tubes. For this purpose the tubes are connected to gas generators providing the pressurized gas for the ejection. Two gas generators are arranged in axial alignment with each other each in a respective ring chamber connected to the respective ejector tube. A valving mechanism including a slide member (7) is arranged centrally between the two gas generators. The valving mechanism makes sure that one gas generator can eject ammunition from several ejector tubes or that the ejector tubes receive gas from both gas generators, or to admit ejector gas from one generator, which is ignited first, to all tubes and thereafter when the second gas generator has been ignited to admit its gas only to tubes ejecting in a certain direction, for generating symmetrical or non-symmetrical scatter patterns.

8 Claims, 4 Drawing Sheets

SCATTER AMMUNITION CONTAINER

FIELD OF THE INVENTION

The invention relates to a scatter ammunition container for transporting and ejecting scatter ammunition carried, for example, by an aircraft. Such containers are secured to the aircraft so that the ejection direction of the scatter ammunition extends across the flight direction away from both sides of the ammunition container.

BACKGROUND INFORMATION

Conventionally, the gas for ejecting the scatter ammunition bodies is generated by gas generators forming part of the scatter ammunition container system. German Patent (DE-PS) No. 3,500,163 discloses a scatter ammunition container of the type just described. In the known system, the gas generator is located off-center relative to the container ejector tubes which are arranged to eject alternately in opposite directions. The arrangement is such that a uniform coverage of the target area is achieved across the motion direction of the scatter container. The uniform coverage is achieved by different ejector speeds of the individual scatter ammunition bodies. These different speeds in turn are achieved due to the application of the pressurized gas in sequence to the individual ejector tubes. Thus, when the ejection of the ammunition bodies from one ejector tube is completed in one direction, the gas now enters into the neighboring ejector tube for ejecting its ammunition bodies in the opposite direction and so on. As a result, a pressure drop takes place from tube to tube, thereby causing the reduction in the ejector speeds. As a result, only a symmetric distribution of the ammunition on both sides of the scatter container is possible. However, it is frequently the case, that the carrier aircraft does not or cannot approach the center of the target. As a result, a portion of the ammunition is scattered outside the target area on the one side, while on the other side the target area is not completely covered with the scatter ammunition.

It is further known from French Patent (FR-PS) No. 2,430,590 to provide a scatter ammunition body for carrying rockets forming the scatter ammunition. The rockets can be discharged in a non-symmetric pattern on both sides of the flight direction. However, the ejector angle relative to the flight direction is dependent on the flight direction. Such an ejector pattern requires a substantial effort and expense for the control means required to permit an election of the ejector angle that is required for any particular target situation. French Patent No. 2,430,590 corresponds to U.S. Pat. No. 4,307,650, issued: on Dec. 29, 1981.

OBJECTS OF THE INVENTION

In view of the foregoing, it is the aim of the invention to achieve the following objects singly or in combination:

to achieve a non-symmetric distribution of the scatter ammunition bodies substantially perpendicularly to the flight direction;

to construct a scatter ammunition container system of the type described above in such a manner that even for the ejection of scatter ammunition from different tubes in the same direction and to both sides of the flight direction a non-symmetrical distribution of the scatter ammunition may be achieved as required in accordance with any particular target approach;

to selectively provide for a control of the scattering pattern by controlling the ignition of the gas generators by igniting the gas generators either simultaneously or in sequence, or by igniting only one or the other of two gas generators; and to control the ejector speeds to obtain selectively larger and smaller ejector speeds for a complete coverage of a target area in the scattering pattern applicable to particular area and flight approach.

SUMMARY OF THE INVENTION

The scatter ammunition container system according to the invention is characterized in that a central tubular member is arranged between the ejector and container tubes. The central tubular member extends in parallel to the ejector tubes and houses two gas generators in ring chambers. A valving mechanism is arranged between the two gas generators. The valving mechanism includes a slide member with overflow channels. One end of each overflow channel opens into one of the two ring chambers. A nonreturn valve is arranged at the other end in each overflow channel upstream of the respective overflow channel inlet into the ring chamber. The arrangement is such that the overflow channels are closed when the slide member is in its centered rest position. When both gas generators are ignited simultaneously, the slide member remains in this centered rest position. If only one gas generator is ignited, or if the two gas generators are ignited in sequence, the slide member is displaced, thereby opening one of the overflow channels. In this instance, namely when one gas generator is ignited or when both gas generators are ignited in sequence, the slide member is arrested in the displaced position.

It is an essential advantage of the invention that it provides a choice in the scattering of the ammunition bodies either by ejecting these bodies in both directions with the same speed, or by ejecting the bodies in one direction with a larger speed and in the opposite direction with a smaller speed. There is a further choice when the ammunition bodies are ejected with the same speed, whereby the ejection speed and thus the ejection range can be selected depending on whether only one or both gas generators are ignited. It is further possible according to the invention to select larger and smaller ejection speeds and thus a complete coverage of the target area with ammunition bodies. This is possible by arranging the ammunition container tubes in series and providing gas generators of different capacities for the sequentially arranged container or ejector tubes. Another possibility to achieve such a control is provided by connecting several ejector or container tubes to one gas generator.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
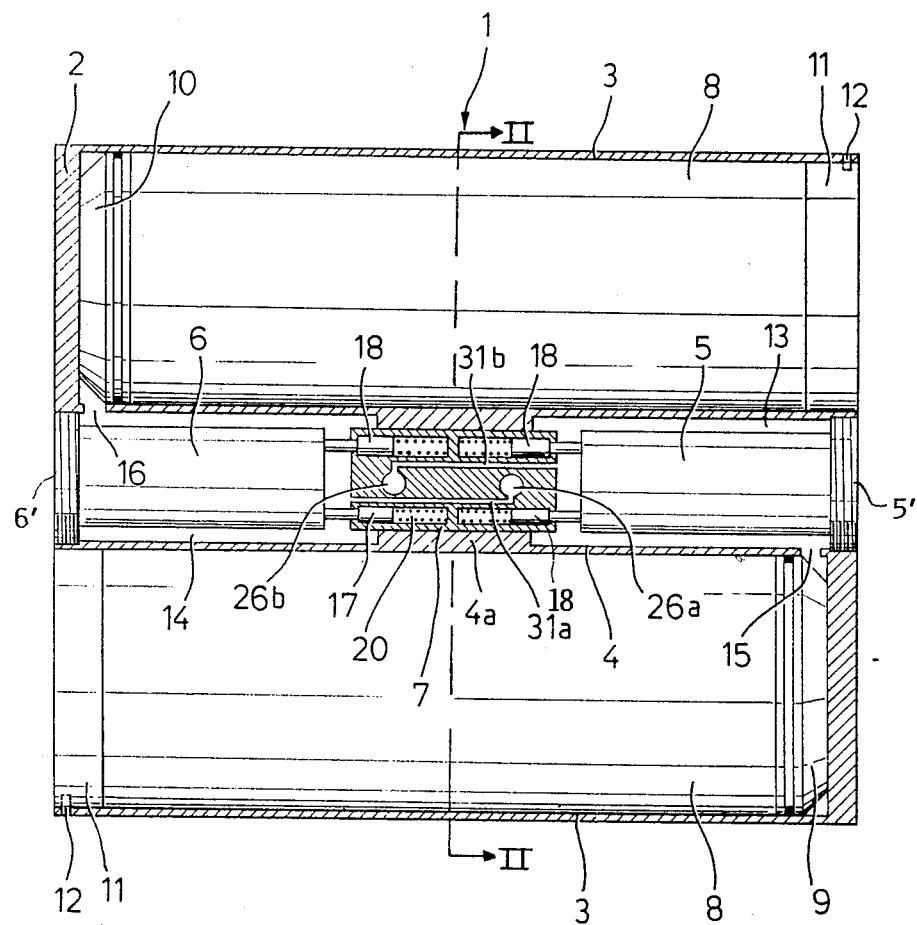
FIG. 1 is an axial sectional view through a scatter ammunition container system according to the invention along section line I—I in FIG. 2.
Figure 2:
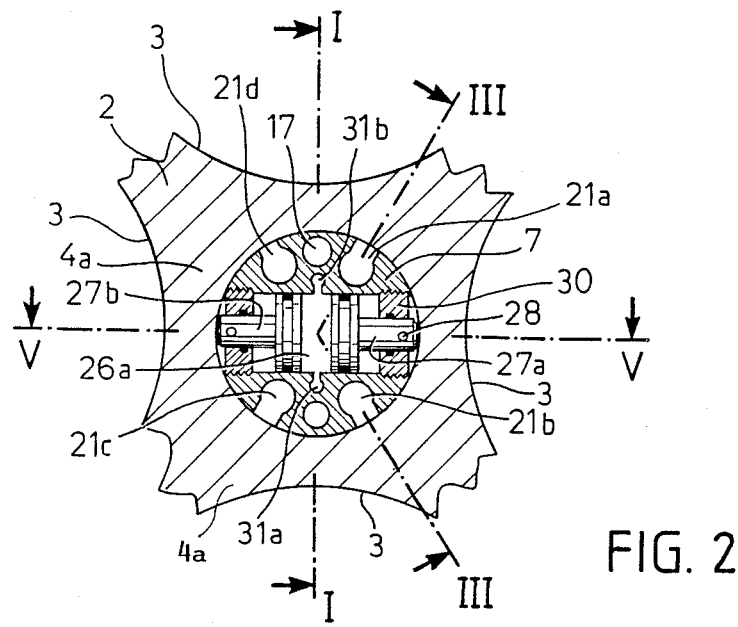
FIG. 2 is a sectional view through the center of the system shown in FIG. 1 along section line II—II.

FIGS. 1 and 2 show a scatter ammunition container system 1 according to the invention, comprising a container 2 enclosing four ejector tubes 3 and a central tubular member 4 arranged coaxially relative to the four ejector tubes 3 and concentrically relative to the central longitudinal axis. A valving mechanism including a slide member 7 is arranged centrally in the central tubular member 4. The slide member 7 is located between two gas generators 5 and 6. Each of the ejector tubes 3 contains a plurality of so-called subammunition bodies 8 not shown in further detail since they are conventional. Each tube comprises a drive piston 9, 10 for ejecting the ammunition bodies 8 in response to a gas pressure which first ejects a cover 11 after shearing off shearing pins 12 which normally hold the cover in place. The upper tube 3 as seen in FIG. 1 ejects the bodies 8 in the rightward direction. The lower ejector tube 3 ejects the ammunition bodies 8 in the leftward direction. The gas required for the ejection is generated by gas generators 5 and 6 which are so constructed that internal ring chambers 13 and 14 are formed around the gas generators 5 and 6 respectively inside the central tubular member 4. The ring chambers 13 and 14 are connected to a space behind the driver pistons 9 and 10 respectively. Thus, the ring space 13 communicates through a port 15 with the space behind the driver piston 9. Similarly, the ring space 14 communicates through a port 16 with the space behind the driver piston 10.

FIG. 2 illustrates four ejector tubes 3 clustered around the central tubular member 4. However, the invention is not limited to a cluster of four ejector tubes 3. Rather, depending on the type of the container system 1, there may be two, six, or any other suitable even number of ejector tubes. The gas generators 5 and 6 are operatively mounted within the inner tubular member 4 by means of mounting and centering bolts 18 received in bores 17 of the slide member 7. The slide member 7 itself is slideably received in a central bore forming a reduced diameter section 4a in the tubular member 4. In other words, the inner diameter of the section 4a is smaller than the inner diameter of the tubular member 4 forming the ring chambers 13 and 14. The centering bolts 18 which are held in the respective gas generators 5 and 6 are slideable in the bores 17 against the force of compression springs 20 also received in these bores 17. These springs 20 are so dimensioned that they normally hold the slide member 7 in a centered position as shown in FIG. 1, while simultaneously pressing the respective gas generators 5 and 6 against closure caps 5', 6' respectively. Thus, the gas generators 5 and 6 are easily replaced by new gas generators in cartridge form by merely opening the threaded closure caps 5', 6'.

Figure 3:
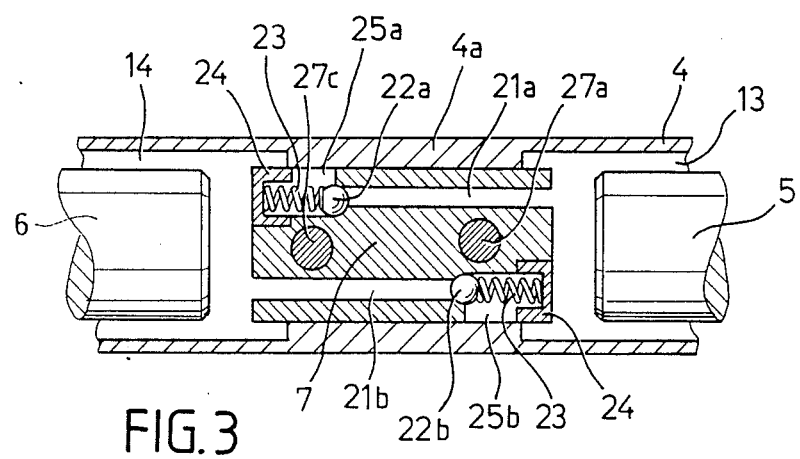
FIG. 3 is a sectional view, partially broken away, along section line III—III in FIG. 2, and illustrating the valving mechanism with its slide member in a centered rest position in which communication between two gas ring chambers is interrupted.

Referring further to FIG. 2, there are four overflow or through flow channels 21a, 21b, 21c, and 21d in the slide member 7. FIG. 3 shows that the channel 21a opens freely into the ring chamber 13 on its right-hand end. The left-hand end of the channel 21a is closed by a nonreturn valve 22a comprising a biasing spring 23 in a closure cap 24, whereby the channel 21a is normally closed relative to the ring chamber 14. The channel 21b is freely open at its left-hand end into the ring chamber 14 while its right-hand end is closed by a nonreturn valve 22b also comprising a biasing spring 23 in a closure cap 24. The left-hand end of the channel 21a has a radially opening lateral port 25a downstream of the nonreturn valve 22a. Similarly, the channel 21b has a radially opening lateral port 25b downstream of the nonreturn valve 22b.

The slide member 7 is further provided with two cross-bores 26a and 26b. Each cross-bore receives two arresting bolts 27a, 27b and 27c, 27d respectively. FIG. 2 shows the arresting bolts 27a and 27b in a side view while FIG. 3 shows a section through the bolt 27a and through the bolt 27b. Normally, the arresting bolts 27 are held in place by shearing pins 28 and screw caps 30 close the cross-bores radially outwardly while simultaneously forming stops for the radial outward movement of the respective bolts 27. Pressurized gas admitting ducts 31a and 31b connect the space inside the cross-bores between the arresting bolts 27a, 27b to the ring chambers 13 and 14 for admitting gas under pressure into these cross-bores to thereby push the arresting bolts radially outwardly as best seen in the FIG. 5, especially the right-hand portion of FIG. 5. For this purpose the radially inner ends of the bolts 27 are constructed as pistons which are guided in the cross-bores 26a, 26b.

Figure 4:
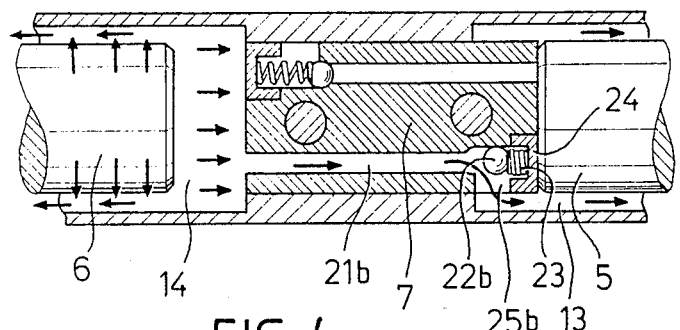
FIG. 4 is a sectional view similar to that of FIG. 3, but showing the axially displaced position of the valve slide member after the ignition of one gas generator on the left-hand side of the system.
Figure 5:
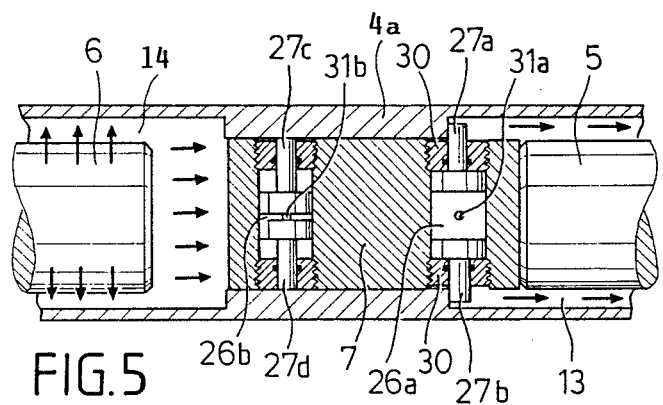
FIG. 5 is a sectional view along section line V—V in FIG. 2 and showing the arresting mechanism for holding the valve slide member in its displaced position after the ignition of the left-hand gas generator.

FIGS. 4 and 5 illustrate the operation of the driving gases on the slide member 7 when only the left-hand gas generator 6 is ignited. The gas generated by the generator 6 is shown by the arrows in FIGS. 4 and 5. The gas pressure drives the slide member 7 to the right against the gas generator 5, whereby the springs 20 in the right-hand bores 17 are compressed and the springs 20 in the left-hand bores 17 expand. The guide bolts 18 are not shown for simplicity's sake, except in FIG. 1. The gas pressure pushes the nonreturn valve ball 22b against the spring 23, thereby compressing the spring 23 in the closure cap 24 and opening the lateral bore 25b so that compressed gas can also enter into the ring chamber 13 as shown. As a result, the driving gases are entering not only into the ring chamber 14, for driving the piston 10 through the channel 16 but also into the ring chamber 13 and through the channel 15 to drive the driving piston 9. Simultaneously, the driving gases flow through the conduit 31a to enter into the space between the locking bolts 27a, 27b in the cross-bore 26a, thus driving the arresting bolts 27a, 27b radially outwardly into the position shown in FIG. 5. For this purpose the shearing bolts 28 are sheared off by the pressure applied to the locking bolts, the radially outer tips of which come to rest against the shoulder of the thicker portion 4a when the piston ends of the bolts 27a, 27b come to rest against the stop nuts 30. In this position the locking bolts 27a, 27b prevent that the slide member 7 can return back into its centered position shown in FIG. 3.

Figure 6:
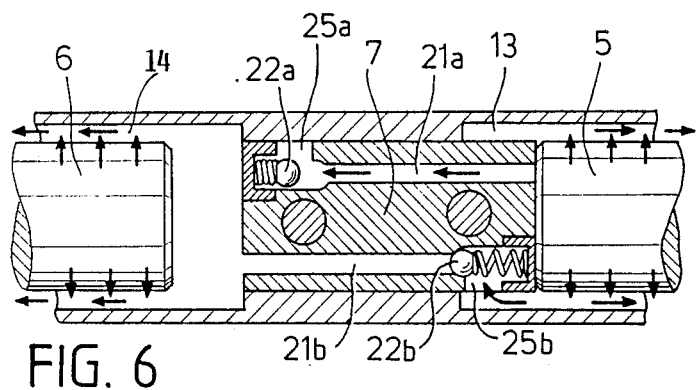
FIG. 6 is a sectional view similar to that of FIG. 4, but illustrating the situation where the second right-hand gas generator has been ignited after the ignition of the left-hand gas generator.
Figure 7:
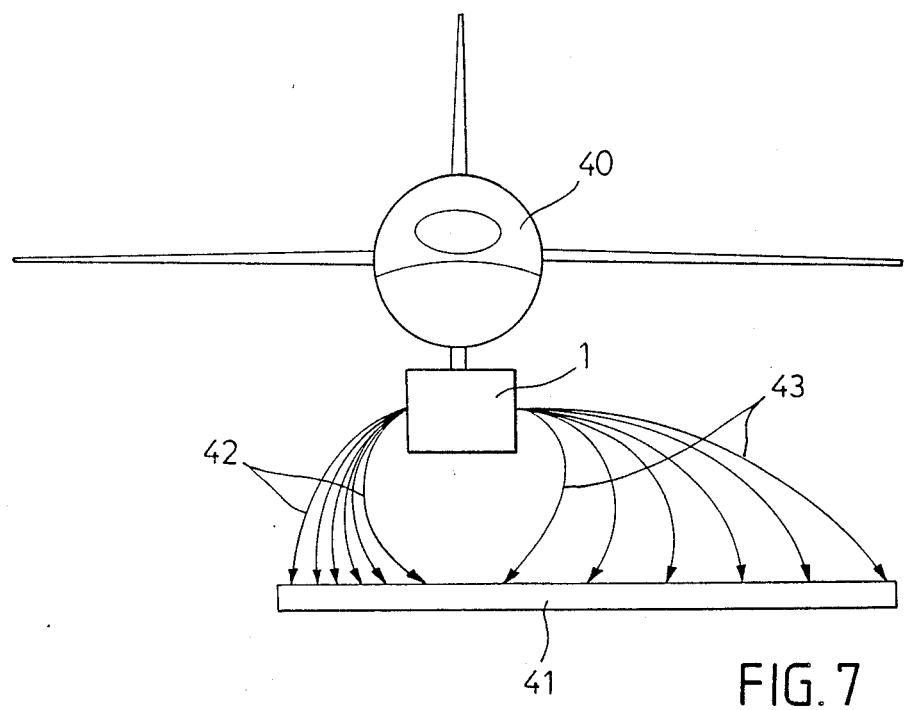
FIG. 7 is a schematic view in the direction opposite to the flight direction of an aircraft carrying the present scatter ammunition container and approaching a target area in an off-center approach, whereby the ammunition bodies are scattered in an assymetric pattern.

Firing only one generator, for example, the generator 6 as illustrated in FIGS. 4 and 5, is required when it is intended that the ammunition bodies 8 shall be ejected with a relatively low speed from the tubes 3. Similarly, only one generator is fired or ignited when it is intended to achieve a non-symmetrical scattering pattern as shown in FIG. 7 when the aircraft 40 approaches a target area 41 in an off-center approach. For such an approach only the right-hand ammunition bodies need to be ejected with a lower speed, please see the trajectory curves 42 in FIG. 7. If it is intended to also cover the larger portion of the target area 41 to the left of the flight direction as seen by the pilot, it is necessary to achieve the scattered trajectories 43 by imparting a higher speed to the ammunition bodies in the leftwardly directed tube or tubes. For this purpose, the second gas generator 5 as shown in FIG. 6 is ignited shortly after the ignition of the gas generator 6. As a result, a higher gas pressure is generated in the ring chamber 13, whereby the higher pressure in the ring chamber 13 again closes the nonreturn valve 22b thereby also closing the overflow channel 21b. Further, the gases generated by the generator 5 flow into the overflow channel 21a, thereby opening the nonreturn valve 22a. However, this is without effect because the lateral port 25a remains closed since the slide member 7 cannot slide to the left due to the locking bolts 27a, 27b. Thus, the opening of the valve 22a remains without effect.

In FIG. 7 an aircraft 40 is equipped with a scatter ammunition container system 1 as disclosed herein. The aircraft 40 approaches the target 41, as mentioned, in an off-center approach. The curves or scatter trajectories 42 illustrate, also as mentioned, the scattering of the ammunition bodies with a small or low ejection speed while the scattered trajectories 43 illustrate the scattering of the ammunition bodies 8 with a larger ejection speed.

Figure 8:
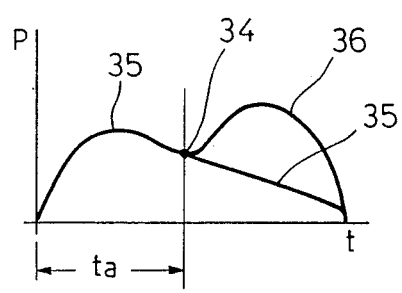
FIG. 8 is a diagram showing the pressure distribution as a function of time when a non-symmetric or assymetric ejection of the ammunition bodies is intended as shown in FIG. 7.

FIG. 8 illustrates the distribution of the pressure P as a function of time t in accordance with the above described operation of FIGS. 4, 5, and 6. These pressure curves represent the pressure in the ring chambers 13 and 14. If only one generator 6 is ignited, the pressure in the chamber 14 first rises as indicated in the left-hand branch of the curve 35. After a time duration $t_a$ following the ignition of the generator 6, the pressure at point 35 is the same in both chambers 13 and 14. If the generator 5 is not ignited at all, the pressure drops as shown in the right-hand portion of the curve 35. However, if the second generator 5 is ignited at the point 34, the pressure curve 36 is generated in the ring chamber 13. As a result, the scatter pattern shown in FIG. 7 is obtained, whereby the generator 6 first produces the gas for the slow ejection of the ammunition bodies 8 in the right direction as viewed by the pilot to obtain scattering trajectories 42. After ignition of the second gas generator 5, the ammunition bodies are ejected in the opposite direction with the higher speed in accordance with the pressure curve 36 to obtain the scatter pattern 43.

Figure 9:
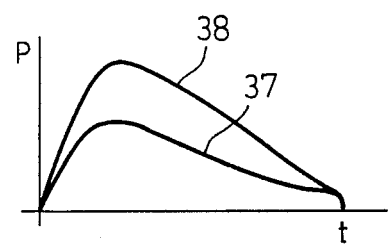
FIG. 9 shows a diagram illustrating the pressure distribution as a function of time for a symmetric ejection of the ammunition bodies.

FIG. 9 illustrates two pressure distribution curves 37 and 38 causing the same ejector speeds in both opposite directions. Curve 37 shows the pressure distribution following the ignition of one gas generator and curve 37 shows the distribution of the pressure when both generators are ignited simultaneously.

In view of the above disclosure, it is clear, that the pattern of the trajectories 43 can also be generated on the right-hand side, as viewed by the pilot, while the pattern of the trajectories 42 can be generated on the left-hand side, as viewed by the pilot. In other words, the present system works symmetrically and/or non-symmetrically in both directions.

As best seen in FIG. 1, each drive piston 9, 10 has a radially inwardly tapering surface away from the ammunition bodies 8 so that pressurized gas passing through the channels 15, 16 can become effective on these drive pistons 9, 10 for ejecting the bodies 8.

Although the invention has been described with reference to specific example embodiments, it will be appreciated that it is intended to cover all modifications and equivalents within the scope of the appended claims.

What I claim is:

1. A scatter ammunition container system having a longitudinal axis, comprising a plurality of container tube means for ejecting ammunition bodies contained in said tube means, gas generator means for generating pressurized gas, valving means for connecting said gas generator means to said tube means for supplying pressurized gas to said tube means for said ejecting, central tubular means arranged concentrically to said longitudinal axis and surrounded by said container tube means, said gas generator means comprising two gas generators (5, 6) arranged in axial alignment with each other in said central tubular means to form ring chambers (13, 14) around said gas generators, said valving means (7) comprising a slide member (7) arranged in said central tubular means intermediate said two gas generators, said slide member comprising through flow channels (21) each leading at one end into a respective one of said ring chambers, said valving means further comprising a nonreturn valve (22) located in each of said through flow channels (21) for closing each through flow channel in one direction of gas flow while permitting gas flow in the opposite direction, said slide member further having ports leading into said through flow channels, said ports being closed when said slide member is in a centered rest position in said central tubular means, said slide members (7) retaining said centered rest position when both gas generators are fired simultaneously for a substantially symmetrical scattering of said ammunition bodies, said slide member (7) being axially displaced in one direction out of said centered rest position in response to a firing of one gas generator and in response to a sequential firing of both gas generators for opening one of said through flow channels for a non-symmetrical scattering of said ammunition bodies, and means for arresting said slide member (7) in an axially displaced position for said non-symmetrical scattering.

2. The system of claim 1, wherein said ring chambers have a given chamber diameter, said central tubular means comprising a central reduced diameter section (4a) compared to said given chamber diameter, wherein said slide member is slidably received in said reduced diameter section, wherein each of said non-return valves is located near an end of its respective through flow channel in said slide member, and wherein said ports are radially opening ports located near said non-return valves.

3. The system of claim 1, wherein said slide member (7) comprises substantially radially extending cross-bores (26) near its ends, said arresting means comprising two arresting bolts (27) received in each of said cross-bores (26), shearing pins for normally holding said arresting bolts in a retracted position, a pressure chamber in said cross-bores between radially inner ends of said two arresting bolts, and pressurized fluid conduit means connecting said pressure chamber to a respective one of said ring chambers for pushing said arresting bolts radially outwardly for arresting said slide member (7) in an axially displaced position.

4. The system of claim 1, wherein said slide member comprises axial bores, said system further comprising support means in said axial bores for centrally mounting each of said gas generators in its respective ring chamber.

5. The system of claim 4, wherein said mounting means comprise centering bolts (18) received in said axial bores (17) and spring means in said axial bores between said bolts and a respective bore bottom for centering said slide member in a central rest position.

6. The system of claim 1, wherein said ring chambers have a larger diameter than said gas generators, said ring chambers further having axially outer end ports (15, 16) for admitting pressurized gas into said container tube means.

7. The system of claim 6, wherein said container tube means comprise ejector piston means for said ejecting, said outer end ports leading into said container tube means behind said ejector piston means.

8. The system of claim 7, wherein said ejector piston means have an inwardly tapering circumferential wall, said outer end ports facing said tapering wall.

* * * * *